US012087456B2

(12) United States Patent
Malloy, III et al.

(10) Patent No.: US 12,087,456 B2
(45) Date of Patent: Sep. 10, 2024

(54) INTEGRAL VESSEL ISOLATION VALVE (71) Applicant: BWXT mPower, Inc., Charlotte, NC (US)

(72) Inventors: John D. Malloy, III, Goode, VA (US); Matthew W. Ales, Puyallup, WA (US); Michael J. Edwards, Forest, VA (US); Ronald C. Watson, Lynchburg, VA (US); Andrew C. Whitten, Lynchburg, PA (US)

(73) Assignee: BWXT mPower, Inc., Charlotte, NC (US)

( * ) Notice: Subject to any disclaimer, the term of this patent is extended or adjusted under 35 U.S.C. 154(b) by 346 days.

(21) Appl. No.: 17/536,404

(22) Filed: Nov. 29, 2021

(65) Prior Publication Data
US 2022/0084701 A1   Mar. 17, 2022

Related U.S. Application Data (62) Division of application No. 16/034,560, filed on Jul. 13, 2018, now Pat. No. 11,189,385, which is a
(Continued)

(51) Int. Cl.
G21C 9/00      (2006.01)
G21C 13/02     (2006.01)
(Continued)

(52) U.S. Cl.
CPC .............. *G21C 13/02* (2013.01); *G21C 9/00* (2013.01); *G21C 13/0285* (2013.01); *G21C 15/24* (2013.01); *Y02E 30/30* (2013.01)

(58) Field of Classification Search
CPC ...... G21C 13/02; G21C 13/0285; G21C 9/00; G21C 9/004; G21D 1/04
See application file for complete search history.

(56) References Cited

U.S. PATENT DOCUMENTS 3,779,865 A   12/1973  Schafstall et al.
3,811,279 A    5/1974  Vogeli
(Continued)

OTHER PUBLICATIONS

Gentec, "KB14 Valve Types and Application," pp. 5, 2008.
International Search Report and Written Opinion for PCT/US2013/036973 dated Aug. 13, 2013.

*Primary Examiner* — Sharon M Davis
(74) *Attorney, Agent, or Firm* — Nelson Mullins Riley & Scarborough LLP (57) ABSTRACT A nuclear reactor comprises a nuclear reactor core disposed in a pressure vessel. An isolation valve protects a penetration through the pressure vessel. The isolation valve comprises: a mounting flange connecting with a mating flange of the pressure vessel; a valve seat formed into the mounting flange; and a valve member movable between an open position and a closed position sealing against the valve seat. The valve member is disposed inside the mounting flange or inside the mating flange of the pressure vessel. A biasing member operatively connects to the valve member to bias the valve member towards the open position. The bias keeps the valve member in the open position except when a differential fluid pressure across the isolation valve and directed outward from the pressure vessel exceeds a threshold pressure.

20 Claims, 5 Drawing Sheets

Related U.S. Application Data division of application No. 13/864,466, filed on Apr. 17, 2013, now Pat. No. 10,026,511.

(60) Provisional application No. 61/625,226, filed on Apr. 17, 2012.

(51) Int. Cl.
  *G21C 13/028* (2006.01)
  *G21C 15/24* (2006.01)

(56) References Cited

U.S. PATENT DOCUMENTS

| | | | |
|---|---|---|---|
| 4,077,837 | A | 3/1978 | Schabert |
| 4,105,044 | A * | 8/1978 | Davitt .............. F16K 15/044 137/517 |
| 4,809,733 | A | 3/1989 | Hawkins |
| 4,834,935 | A | 5/1989 | Daigle et al. |
| 5,053,190 | A | 10/1991 | Gardner et al. |
| 5,089,218 | A | 2/1992 | Gardner et al. |
| 5,465,280 | A | 11/1995 | Wedellsborg |
| 5,517,538 | A | 5/1996 | Seidelberger et al. |
| 5,563,927 | A | 10/1996 | Siegel et al. |
| 5,583,900 | A | 12/1996 | Kasahara et al. |
| 5,684,846 | A | 11/1997 | Meneely et al. |
| 5,715,288 | A | 2/1998 | Matteson |
| 5,789,720 | A | 8/1998 | LaGally et al. |
| 5,935,439 | A | 8/1999 | Hart et al. |
| 6,091,791 | A | 7/2000 | Matsumoto et al. |
| 6,546,066 | B2 | 4/2003 | Baliga et al. |
| 6,618,460 | B2 | 9/2003 | Baliga et al. |
| 6,769,262 | B1 | 8/2004 | Gray |
| 6,888,908 | B1 | 5/2005 | Klarner et al. |
| 6,909,765 | B2 | 6/2005 | Lahoda |
| 7,139,359 | B2 | 11/2006 | Baliga et al. |
| 7,389,669 | B2 | 6/2008 | Badlani et al. |
| 7,567,645 | B2 | 7/2009 | Baliga |
| 10,026,511 | B2 | 7/2018 | Malloy, III et al. |
| 11,189,385 | B2 | 11/2021 | Malloy, III et al. |
| 2004/0017877 | A1 | 1/2004 | Hartel et al. |
| 2004/0136488 | A1 | 7/2004 | Tuite et al. |
| 2005/0117684 | A1 | 6/2005 | Klarner et al. |
| 2005/0190877 | A1 | 9/2005 | Knapp |
| 2005/0199591 | A1 | 9/2005 | Coe et al. |
| 2010/0124303 | A1 | 5/2010 | Young et al. |
| 2010/0181516 | A1 | 7/2010 | Palanchon et al. |
| 2011/0147016 | A1 | 6/2011 | Blease et al. |
| 2011/0284104 | A1 | 11/2011 | Gutierrez |
| 2013/0070887 | A1 | 3/2013 | Kim et al. |

\* cited by examiner

INTEGRAL VESSEL ISOLATION VALVE

CLAIM OF PRIORITY

This application is a divisional of U.S. patent application Ser. No. 16/034,560, filed Jul. 13, 2018, now U.S. Pat. No. 11,189,385, which is a divisional of U.S. patent application Ser. No. 13/864,466, filed Apr. 17, 2013, now U.S. Pat. No. 10,026,511, which claims the benefit of U.S. Provisional Application No. 61/625,226 filed Apr. 17, 2012, the entire disclosures of which are incorporated by reference herein.

BACKGROUND

The following relates to the nuclear power reactor arts, nuclear reaction coolant system arts, nuclear power safety arts, and related arts.

Light water nuclear reactors are known for maritime and land-based power generation applications and for other applications. In such reactors, a nuclear reactor core comprising a fissile material (for example, $^{235}U$) is disposed in a pressure vessel and immersed in primary coolant water. The reactor core heats the primary coolant in the pressure vessel, and the pressure vessel includes suitable devices, such as heaters and spargers, for maintaining the primary coolant at a designed pressure and temperature, e.g., in a subcooled state in typical pressurized water reactor (PWR) designs, or in a pressurized boiling water state in boiling water reactor (BWR) designs. Various vessel penetrations take primary coolant into and out of the pressure vessel. For example, in some PWR designs primary coolant is passed through large-diameter penetrations to and from an external steam generator to generate steam for driving a turbine to generate electrical power. Alternatively, an integral steam generator is located inside the reactor pressure vessel, which has advantages such as compactness, reduced likelihood of a severe loss of coolant accident (LOCA) event due to the reduced number and/or size of pressure vessel penetrations, retention of the radioactive primary coolant entirely within the reactor pressure vessel, and so forth. Additional smaller diameter vessel penetrations are provided to add primary coolant (i.e., a makeup line) or remove primary coolant (i.e., a letdown line). These lines are typically connected with an external reactor coolant system inventory purification device (RCI) that maintains a reservoir of purified primary coolant. Further vessel penetrations may be provided to connect with an emergency condenser, or for other purposes.

Light water reactors must be evaluated to determine their response in the event that a pipe outside of the reactor vessel breaks and a loss of coolant accident (LOCA) occurs. The compact integral reactor design was developed, in part, to minimize the consequence of an external pipe break. However, the integral reactor designs still utilize small bore connecting piping that transports reactor coolant to and from the reactor vessel. Breaks in these pipes can cause a LOCA, and must be evaluated as design basis accidents.

BRIEF SUMMARY

In accordance with one aspect, a nuclear reactor comprises: a nuclear reactor core comprising a fissile material; a pressure vessel containing the nuclear reactor core immersed in primary coolant disposed in the pressure vessel; and an isolation valve including a mounting flange secured to a wall of the pressure vessel and a valve body disposed in the wall or in a flange assembly including the mounting flange, the isolation valve closing responsive to a pressure difference across the valve exceeding a threshold pressure difference.

In accordance with another aspect, a system comprises: at least one coolant pump configured to pump coolant water into or out of an associated nuclear reactor vessel; at least one external coolant conduit connecting said at least one coolant pump with the associated nuclear reactor vessel; and a vessel isolation valve having a mounting flange configured to connect with a mating flange of a vessel penetration through an outer wall of the associated nuclear reactor vessel. The vessel isolation valve fluidly connects with the at least one external coolant conduit. The vessel isolation valve is configured to block outward flow from the pressure vessel when a pressure differential across the valve exceeds prescribed criteria. The vessel isolation valve further includes: a valve seat defined in the mounting flange; a moveable valve member movable between an open position permitting flow through the vessel isolation valve and a closed position seating against the valve seat to block flow through the vessel isolation valve; and a biasing member that biases the valve member towards the open position.

In accordance with another aspect, an isolation valve comprises: a mounting flange configured to connect with a mating flange of a pressure vessel; a valve seat formed into the mounting flange; and a valve member movable between an open position permitting flow through the isolation valve and a closed position in which the valve member seals against the valve seat to block flow through the isolation valve. The valve member is disposed inside the mounting flange or is arranged respective to the mounting flange so as to be disposed inside the mating flange of the pressure vessel when the mounting flange is connected with a mating flange of a pressure vessel. The isolation valve optionally further comprises a biasing member operatively connected to the valve member to bias the valve member towards the open position. If included, the biasing member is suitably configured to provide bias effective to keep the valve member in the open position except when a differential fluid pressure across the isolation valve and directed outward from the pressure vessel exceeds a threshold pressure.

In accordance with another aspect, an apparatus comprises a pressure vessel including a mating flange and an isolation valve as set forth in the immediately preceding paragraph whose mounting flange is connected with the mating flange of the pressure vessel. In accordance with another aspect, an apparatus comprises a nuclear reactor comprising (i) a pressure vessel including a mating flange and (ii) a nuclear reactor core comprising fissile material disposed in the pressure vessel, and further includes an isolation valve as set forth in the immediately preceding paragraph whose mounting flange is connected with the mating flange of the pressure vessel of the nuclear reactor.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
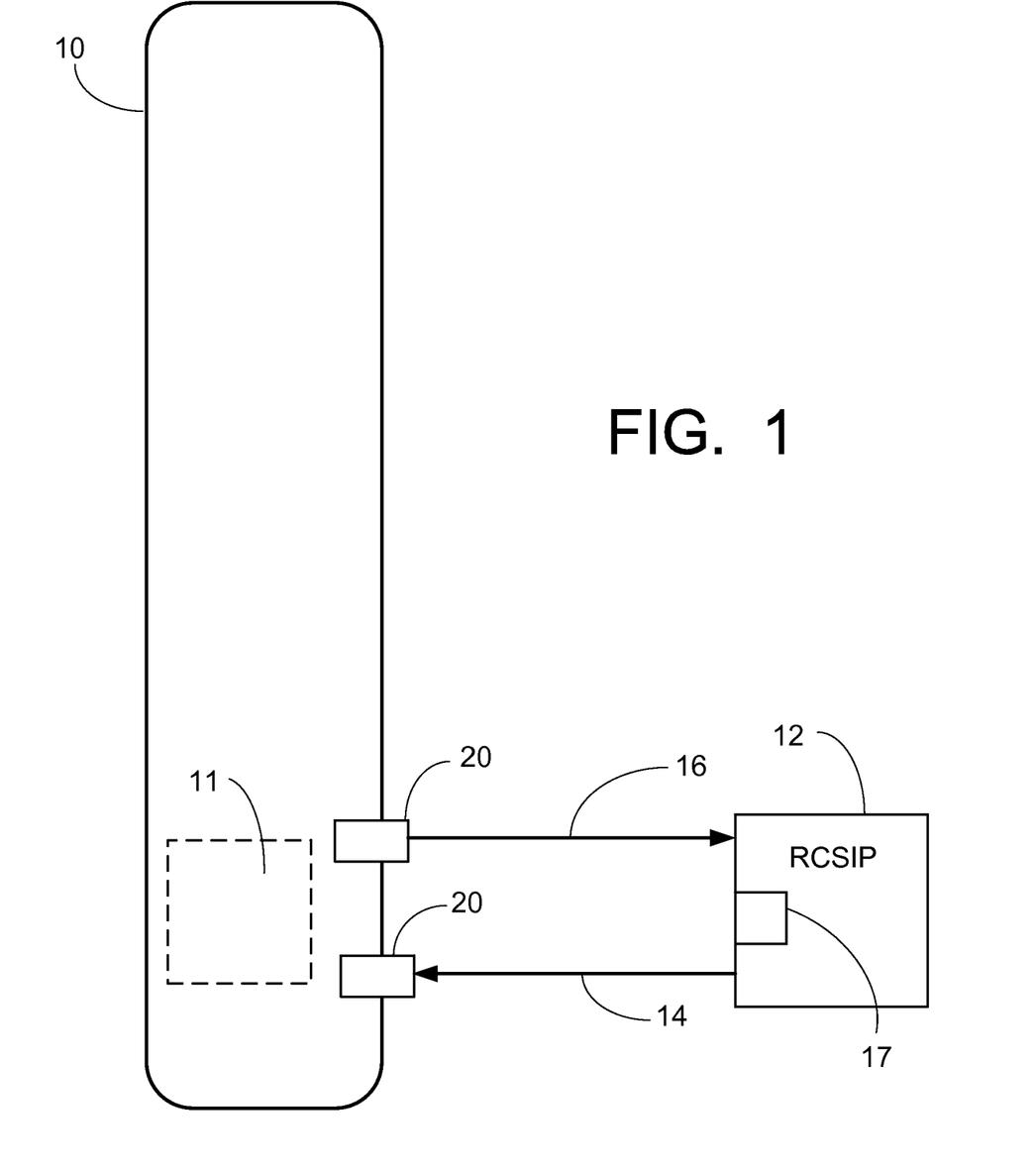
FIG. 1 is a schematic diagram of an exemplary reactor coolant system.

FIG. 1 is a schematic illustration of a nuclear reactor including a pressure vessel 10. The pressure vessel 10 contains a nuclear reactor core 11 (shown in phantom) disposed at or near the bottom of the pressure vessel 10 and immersed in primary coolant water also disposed in the pressure vessel 10. The pressure vessel 10 further contains numerous internal components that are not visible in FIG. 1 but which are known in the art, such as structures defining a primary coolant flow circuit, e.g. a hollow cylindrical central riser defining a hot leg inside the riser and a cold leg in a downcomer annulus (e.g., flow region) defined between the central riser and the pressure vessel 10, and neutron-absorbing control rods and associated drive mechanisms for controlling reactivity of the nuclear reactor core. Some embodiments, e.g. integral pressurized water reactor (PWR) designs, also include one or more steam generators disposed inside the pressure vessel, typically in the downcomer annulus.

A reactor coolant system inventory purification device (RCI) 12 is provided to maintain the quantity and purity of primary coolant inside the pressure vessel. A makeup line 14 delivers primary coolant from the RCI 12 to the pressure vessel 10, and a letdown line 16 removes primary coolant from the pressure vessel 10 into the RCI 12. The RCI 12 includes a pump 17 and other water processing components (not shown) for purifying and storing reserve primary coolant, injecting optional additives such as a soluble boron compound (a type of neutron poison optionally used to trim the reactivity), or so forth. Integral isolation valves 20 are provided at respective vessel penetration locations where the makeup line 14 and letdown line 16 pass through an outer wall 18 of the pressure vessel 10. The integral isolation valves 20 are configured to control flow into and/or out of the pressure vessel 10 through the makeup line 14 and letdown line 16 such that, during a LOCA, flow of coolant out of the pressure vessel 10 is automatically blocked.

Figure 2:
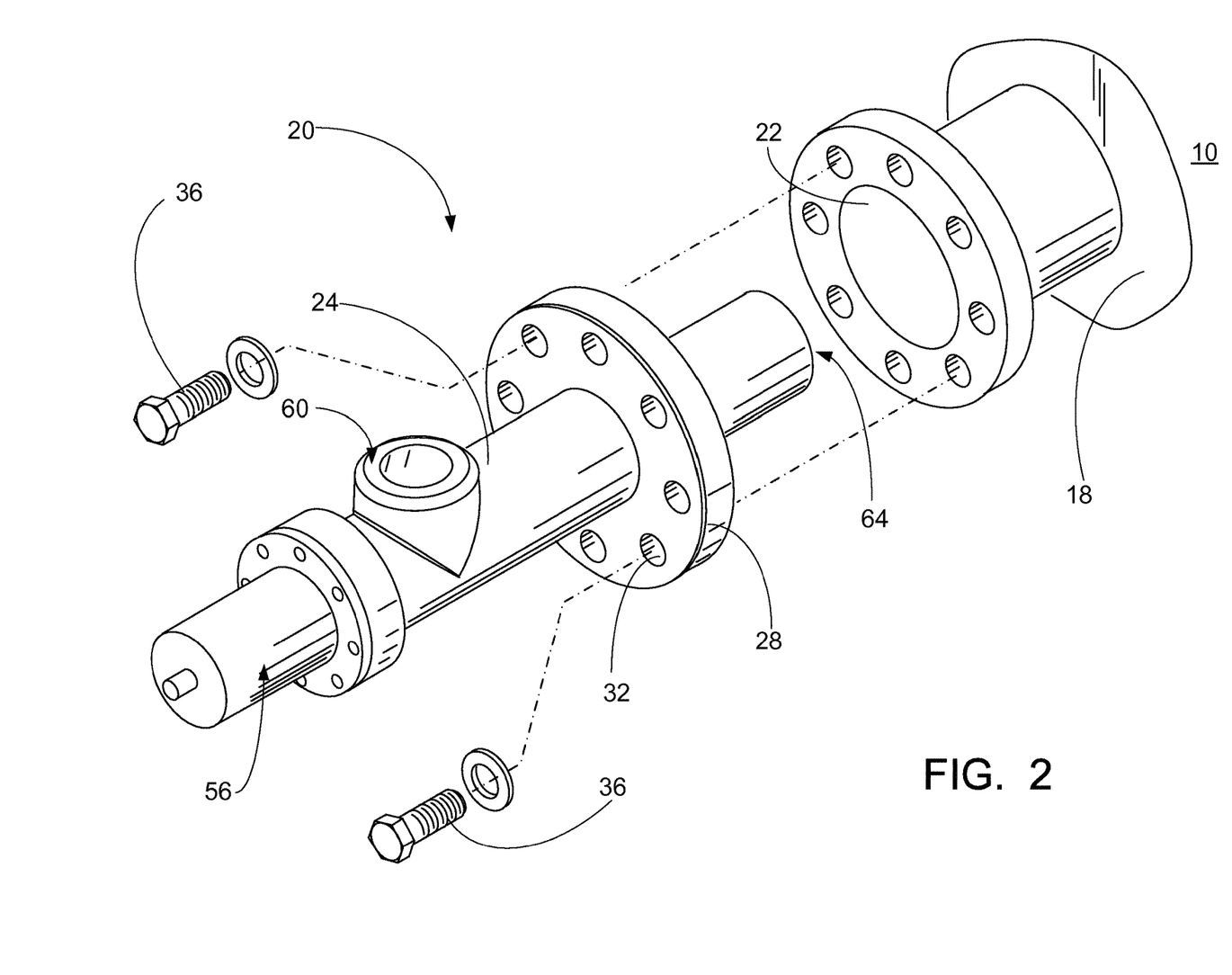
FIG. 2 is a perspective view of an exemplary vessel isolation valve.
Figure 3:
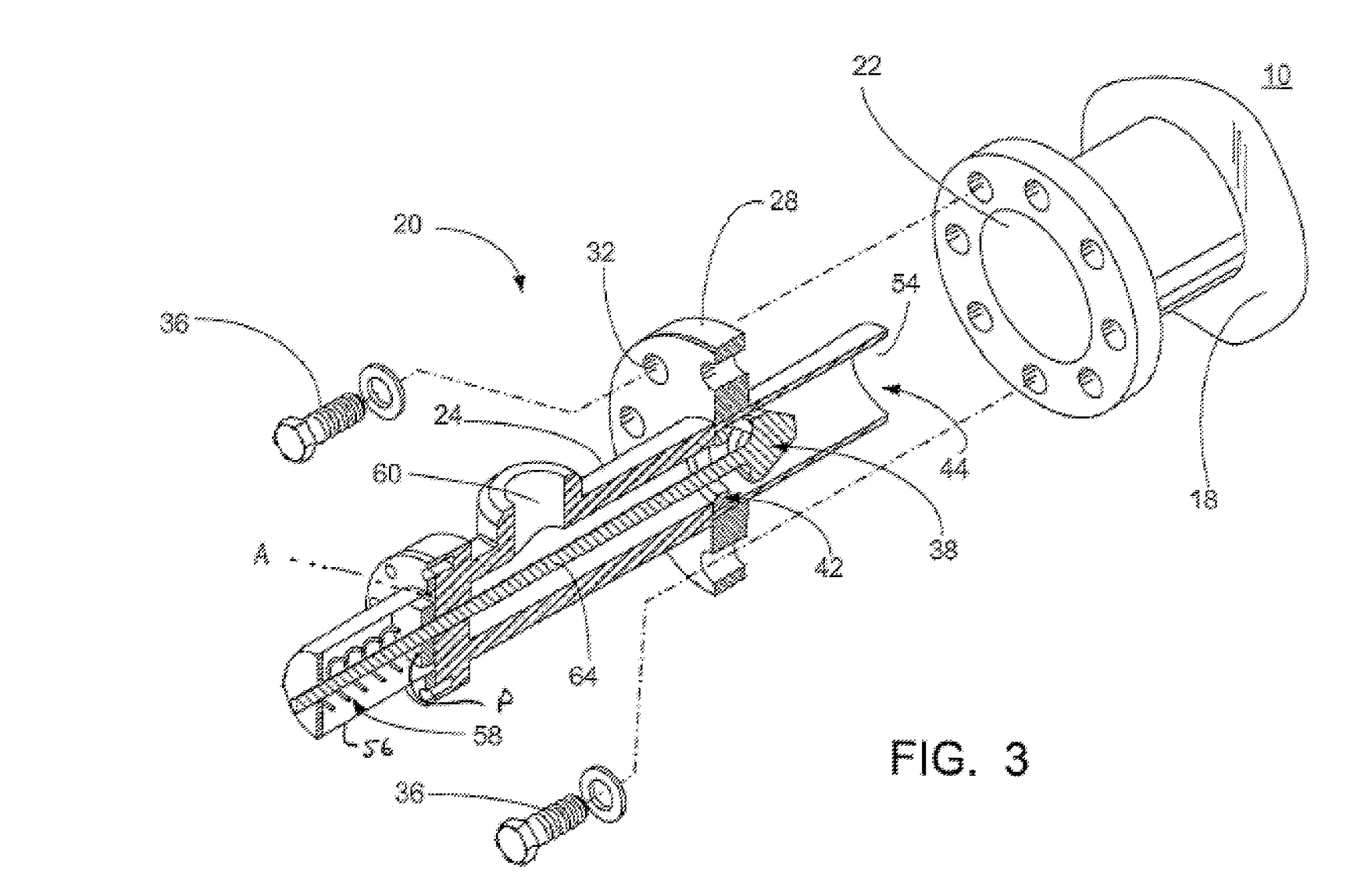
FIG. 3 is a perspective cutaway view of the isolation valve of FIG. 2.

Turning to FIGS. 2 and 3, an exemplary integral vessel isolation valve 20, hereinafter referred to as simply an isolation valve 20, generally includes a biased open axial flow stop valve that is bolted or otherwise secured to a vessel penetration flange 22 providing a fluid penetration through the outer wall 18 of the reactor pressure vessel 10. As seen in FIG. 2, the exemplary isolation valve 20 generally includes a valve body 24 having a mounting flange 28 for securing the valve body 24 to the mating flange 22 of the reactor pressure vessel 10. The mounting flange 28 includes a plurality of bolt holes 32 for receiving bolts 36 or other fasteners for securing the valve body 24 to the flange 22 of the reactor pressure vessel 10. The flange 22 of the pressure vessel 10 may be inset into or flush with the wall 18 of the pressure vessel 10, or may extend outward as shown in FIGS. 2 and 3, e.g. a forging or casting integrally formed with the wall 18 or welded to the wall 18. The flange 22 has corresponding holes for receiving fasteners (e.g., bolts 36). Suitable sealing elements, such as gaskets or o-rings, can be provided for sealing the connection of the flanges 22, 24.

As best seen in FIG. 3, which is a cross-sectional view of the isolation valve 20 taken through a central longitudinal axis thereof, the exemplary isolation valve 20 includes a valve member in the form of a piston 38 that is supported within the valve body 24 for reciprocating axial movement. The piston 38 is configured to seal against a valve seat 42 that is generally formed by a radially-inwardly extending shoulder within a central bore 44 of the valve body 24. When mounted to the pressure vessel 10, the piston 38 and valve seat 42 are located inside the wall 18 of the reactor pressure vessel 10, or at least inside the flange 22 extending away from the wall 18 (in some embodiments in which the flange protrudes away from the wall 10). The function of the isolation valve 20 is to seal the penetration 22 in the reactor pressure vessel 10 in the event of a pipe break or other sudden loss of pressure in the pipes external to the reactor pressure vessel 10, such as makeup line 14 and/or letdown line 16. Such sealing thus occurs at or within an outer boundary of the pressure vessel 10.

As noted, the valve body 24 is generally hollow and has internal bore 44 extending from a first axial end to a second axial end thereof. The first axial end of the valve body 24 is configured to be received within the penetration 22 and serves as a flow inlet or outlet 54 (depending on the direction of flow through the isolation valve 20). The end 54 may be an open end in fluid communication with the downcomer annulus or other plenum defined inside the pressure vessel 10, or may connect to internal piping or other flow passages (not shown) within the pressure vessel 10. The second axial end of the valve body 24 is enclosed by a spring cover 56 which, as will be described in more detail below, houses a spring 58 for biasing the piston valve member 38 to an open position.

An opening 60 in the valve body 24 communicates with the central bore 44 such that fluid can flow between the central bore 44 and the opening 60. The opening 60 functions as a flow inlet or outlet (again, depending on the direction of flow through the isolation valve 20). The opening 60 can be connected to suitable piping, such as makeup line 14 or letdown line 16, depending on its specific application.

As noted above, a movable valve member in the form of piston 38 is supported within the central bore 44 of the valve body 24 for reciprocating axial movement between an open position (as shown in FIG. 3) permitting flow through the bore 44, and a closed position whereat the piston 38 seals against the valve seat 42 within the central bore 44, thus blocking flow through the central bore 44. In the illustrated embodiment, the valve seat 42 is generally coaxially aligned with the mounting flange 28 such that when the valve body 24 is secured to a pressure vessel, the valve seat 42 is disposed within the interior of the pressure vessel 10, or within the wall 18, or within the vessel penetration flange assembly 22, 28 (that is, an assembly of secured flanges 22, 28 that does not include any intervening piping).

A rod 64 is connected with the piston 38 and extends axially through the central bore 44 and protrudes from the second axial end of the valve body 24. The protruding end of the rod 64 is operatively connected to a biasing member in the form of the spring 58 that is contained within spring cover 56. Spring 58 is in compression and acts between the spring cover 56 and the rod 64 to bias the piston 38 towards the open position as shown in FIG. 3. Absent any flow through the central bore 44, the spring 58 generally maintains the piston 38 in its open position.

During normal operation of the isolation valve 20, the spring 58 is configured to maintain the piston 38 in its open position to permit flow between the axial inlet/outlet 54 in the valve body 24 and the inlet/outlet 60 of the valve body 44. That is, the spring 58 is configured to apply enough force to the piston 38 to permit a desired amount of flow through the valve 20 in either direction during normal operation.

However, if the pressure on the inside of the pressure vessel 10 exceeds a prescribed pressure threshold, such pressure acting on piston 38 will overcome the preload spring bias thereby shifting the piston 38 to the closed position sealing the piston 38 against valve seat 42 and preventing flow from the interior of the pressure vessel through the penetration 22.

It should be appreciated that, when installed on a pressure vessel 10, the valve 20 operates to seal the penetration 22 automatically when the pressure differential across the valve exceeds a threshold value. The threshold value can be set at least in part by the amount of bias applied to the piston 38 by spring 58. For example, during normal operation the pressure differential across the valve 20 may be minimal, and the spring 58 therefore would act to keep the piston 38 in the open position. In some instances, the pressure differential across the valve may increase. For example, a break in an external pipe connected to the valve 20 would result in a decrease in the pressure at inlet/outlet 60. If this decrease in pressure is large enough, it may have the effect of increasing the pressure differential between inlet/outlet 54 and inlet/outlet 60 such that the bias applied to the piston 38 by spring 58 would be overcome and thereby shift the piston to the closed position. The piston 38 would then remain in the closed position as long as the pressure differential that shifted the valve to the closed state continues to exist.

It will be appreciated that spring 58 can be configured to provide different levels of biasing force to the piston 38. For example, a plurality of springs having various spring constants can be provided, and a given spring chosen and installed into the valve 20 depending on a particular application. Alternatively, or in addition, a spring preload mechanism can be used to apply a preliminary preload to spring 58 to vary the force applied to the piston 38. Such a spring pretension mechanism can include a spring cover 56 having an axial length that is less than the axial length of the spring 58 such that, when installed, the spring cover 56 compresses the spring 58. By providing spring covers of different axial length, more or less preload can be applied to a given spring.

Since the spring and spring cover of the valve shown in FIGS. 2 and 3 are located external to the pressure vessel 10 when the valve 20 is installed thereon, conventional materials can generally be used for the spring element and/or spring cover. The spring cover 56 and spring 58 are not safety-critical, because failure or removal of the spring cover 56 and/or spring 58 would simply remove the bias force keeping the isolation valve open and cause the valve to close to prevent coolant from escaping from the pressure vessel. (Alternatively, if there is positive flow from the opening 60 to the inlet/outlet 54 the valve may stay open in spite of the failure of the biasing mechanism 56, 58; but, in that case again no fluid would escape from the pressure vessel 10 because the flow would be into the vessel 10). It should be appreciated, however, that the spring and/or portions thereof could extend into the pressure vessel 10 or into the wall 18 or flange 22, or be located entirely within the pressure vessel.

Figure 4:
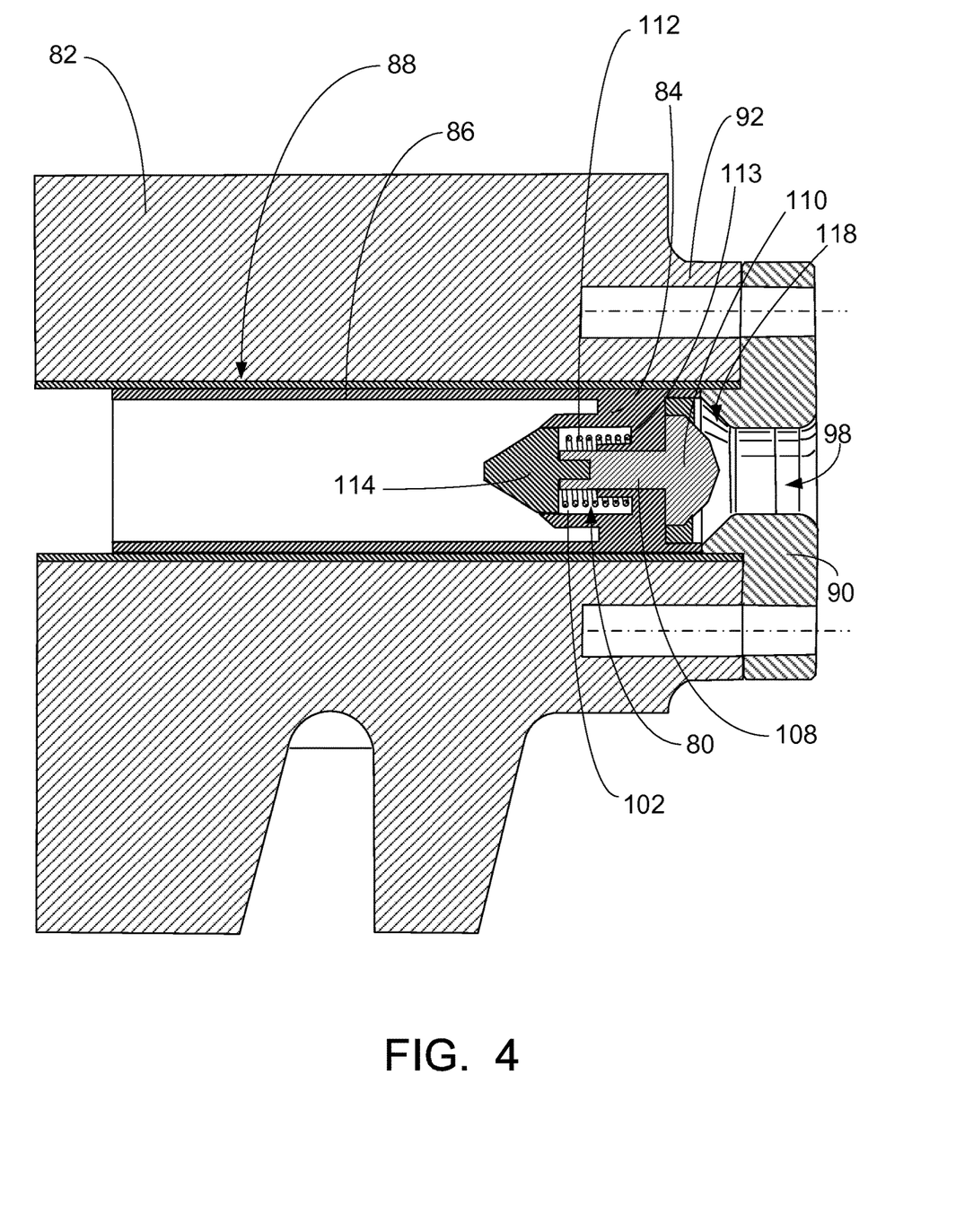
FIG. 4 is a cross-sectional view of another exemplary isolation valve.

Turning to FIG. 4, another exemplary isolation valve 80 is illustrated having a spring element that is configured to be supported within a pressure vessel wall 82 (or within a welded flange extending therefrom) when installed. In this embodiment, the valve 80 is supported within a generally cylindrical valve body 84 that includes a thermal sleeve 86. The valve body 84 is supported within a bore 88 extending through the vessel wall 82. An annular space is formed between the thermal sleeve 86 and the bore 88 in which primary coolant can circulate for reducing thermal shock to fluid flowing into the reactor pressure vessel 82.

In the illustrated embodiment, the valve body 84 is welded or otherwise secured to a mounting flange 90 that is configured to be bolted to a mating flange 92 that is flush with, inset into, or protrudes from the pressure vessel wall 82. A central passageway 98 in the mounting flange 90 communicates with a central passage 102 of the valve body 84. Supported within the central passage 102 of the valve body is a moveable valve member 108 that is biased to an open position by compressed spring 112. In this regard, spring 112 is interposed between radially inwardly extending ribs or vanes 113 of the valve body 84 and a spring retaining ribs or vanes 114 of the valve member 108 such that the spring biases the valve member 108 to the left in FIG. 4 and maintains it in an open position during normal operation. The moveable valve member 108 includes a sealing head 110 that is adapted to seal against a generally conical valve seat 118 formed in the flange 90, as will be described.

Under normal operating conditions, the valve is configured to permit flow into the pressure vessel through the valve 80 from external piping, such as makeup line 14 shown in FIG. 1, with the spring 112 and pressure of the fluid flowing into the pressure vessel 82 acting to maintain the valve member 108 in the open position. In this open position, the ribs or vanes 113, 114 are spaced apart or have fluid passageways so that fluid can flow into the pressure vessel via the central passageway 98 and the thermal sleeve 86. Should the pressure differential (in the outward direction) across the valve 80 exceed the spring bias applied to the valve member 108, such as when a break in the external piping is experienced (or when pressure inside the vessel 82 increases), the pressure in the pressure vessel 82 will act to compress the spring 112 and the valve member 108 will shift to the right from its position in FIG. 4 and seal against valve seat 118. This effectively seals the penetration through pressure vessel wall 82 in the event of a LOCA, and the valve will generally remain in the closed position until the pressure differential that resulted in the closing of the valve is mitigated.

It will further be appreciated that the illustrated valve can also accommodate fluid flowing out of the pressure vessel 82 through the valve 80, such as letdown flow flowing into letdown line 16. In such a configuration, the spring bias maintains the valve member in the open position against the pressure of fluid flowing out of the pressure vessel 82. A sudden increase in pressure within the pressure vessel 82, or a drop in pressure of fluid in the letdown line (due to a break, for example) such that the pressure differential in the outward direction exceeds a closure threshold will result in the valve member 108 shifting to the closed position. Various springs can be used to provide a valve with desired operating characteristics. For example, in some applications a relative high bias open force may be desired, and a very stiff spring can be utilized to achieve the desired bias.

The thermal sleeve 86 provides protection against thermal shock, and is advantageous for the isolation valve protecting the make-up line 14. On the other hand, thermal shock to the nuclear reactor is less likely to occur in the case of the let-down line 16. Accordingly, in some embodiments the thermal sleeve is omitted. In such cases, the inner wall of the bore 88 extending through the vessel wall 82 suitably serves as the anchor for the isolation valve. Alternatively, a sleeve structurally similar to the thermal sleeve 86 may be provided, but made of thermally conductive material and/or without any gap between the sleeve and the bore 88. It should also be noted that the valve seat 118 is a surface of the flange 90, and accordingly proper sealing of the isolation valve is not dependent upon the structural strength or integrity of the sleeve 86.

In some embodiments, it may be desired to provide additional closure force to assist and/or ensure closure of the valve. For example, with reference back to FIG. 3, an electrical, pneumatic or hydraulic actuator piston P can be connected with the end of the rod 64. When working fluid is injected into the actuator piston P via actuation line A, the actuator piston acts via the rod 64 to actively pull the piston 38 into closure against the valve seat 42. A solenoid with electrical actuation could be substituted for the actuator piston P and fluid actuation line A.

As another option, a latch disposed on the rod 64 can engage a locking mechanism (features not shown) when piston 38 moves to the closed position so as to lock the piston in the closed position. The locking mechanism can include a manual or electrically actuated release so that the isolation valve only re-opens when the operator activates the release. This arrangement ensures that the isolation valve cannot re-open prematurely (that is, before the operator intends for it to reopen).

The isolation valves of FIGS. 2-4 provide bidirectional operation, and only close upon an outward pressure differential greater than a threshold value. Such isolation valves can be used for both makeup lines 14 and letdown lines 16. However, if the vessel penetration is intended to support only unidirectional flow into the pressure vessel, then the valve can be modified accordingly.

Figure 5:
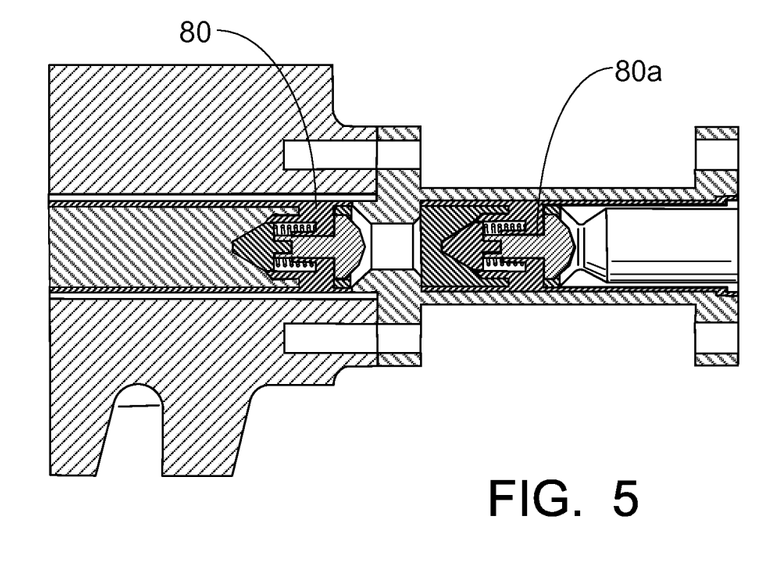
FIG. 5 is a perspective cutaway view of another exemplary isolation valve.
Figure 6:
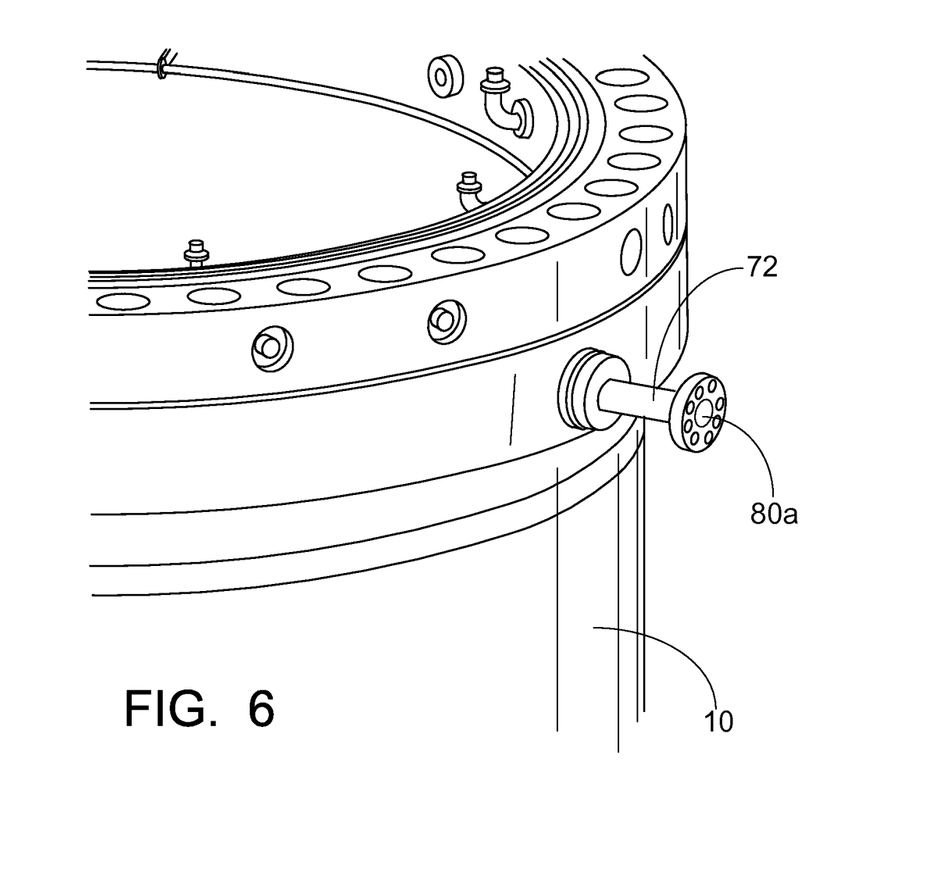
FIG. 6 is a perspective view of the valve of FIG. 5.

With reference to FIGS. 5-6, another isolation valve embodiment includes two valves 80, 80a aligned in series, wherein the inner valve 80 is located inside wall of the pressure vessel and the outer valve 80a is located inside a wall forging 72 that is external to the pressure vessel 10 such that it may be bolted to the pressure vessel 10.

The disclosed isolation valves passively isolate vessel penetrations that are in fluid communication with the reactor coolant in the pressure vessel in the event of a pressure rise inside the pressure vessel. As shown in FIG. 1, these isolation valves are suitably used on makeup and letdown lines. Additionally, they may find application in protecting other vessel penetrations, such as the return line of an emergency condenser. Because the disclosed isolation valves are located inside the pressure vessel wall or inside a welded vessel penetration flange or in a flange assembly, they are failsafe against pipe breakages. (As previously noted, in the embodiment of FIGS. 2 and 3 although the biasing elements 56, 58 are outside the pressure vessel and flange assembly the valve components, e.g., piston 38 and valve seat 42, would continue to operate to provide failsafe operation even if the biasing elements 56, 58 are broken off). Although not illustrated, in the embodiment of FIG. 4 or FIG. 5 the flange 90 may optionally be a spool flange enabling a flanged connection of an external component to the flange 90. In this case, there is no external piping between the external component and the vessel penetration, and the vessel penetration is protected by the isolation valve.

The disclosed vessel isolation valves are well-suited for use in conjunction with protecting a vessel penetration in a nuclear reactor pressure vessel. However, the disclosed vessel isolation valves are more generally applicable to protecting a vessel penetration in a pressure vessel generally, i.e., in a pressure vessel for an application other than housing a nuclear reactor.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A nuclear reactor comprising:
a nuclear reactor core;
a pressure vessel configured to contain the nuclear reactor core; and
an isolation valve including a mounting flange secured to a wall of the pressure vessel and a valve body disposed in the wall or in a flange assembly including the mounting flange, the isolation valve configured to close responsive to a pressure difference across the valve exceeding a threshold pressure difference, wherein:
the mounting flange includes a valve seat defined in the mounting flange; and
the valve body includes a valving element biased away from the valve seat defined in the mounting flange;
wherein a pressure difference across the valve exceeding the threshold pressure difference closes the isolation valve by causing the valving element to seat against the valve seat defined in the mounting flange.

2. The nuclear reactor of claim 1 wherein the isolation valve further includes a rod connected with the valving element and engaging a biasing element.

3. The nuclear reactor of claim 2 wherein the biasing element comprises:
a spring engaging the rod.

4. The nuclear reactor of claim 3 wherein the spring is disposed in the wall of the pressure vessel or in the flange assembly.

5. The nuclear reactor of claim 3 wherein the spring is disposed outside the wall of the pressure vessel and outside the flange assembly.

6. The nuclear reactor of claim 1 further comprising an actuator operative to facilitate closure of the valve.

7. The nuclear reactor of claim 6 wherein the actuator comprises an actuator piston.

8. A nuclear reactor comprising:
a nuclear reactor core;
a pressure vessel configured to contain the nuclear reactor core; and
an isolation valve including a mounting flange secured to a wall of the pressure vessel and a valve body disposed in the wall or in a flange assembly including the mounting flange, the isolation valve configured to close responsive to a pressure difference across the valve exceeding a threshold pressure difference, wherein the valve body comprises:
a tube having a first end opening to a valve seat defined in the mounting flange; and
a valve member disposed in the tube having a sealing head sized to seat against the valve seat defined in the mounting flange.

9. The nuclear reactor of claim 1 wherein the isolation valve further comprises:
a thermal sleeve, the valve body being disposed in the thermal sleeve.

10. The nuclear reactor of claim 8 further comprising a biasing mechanism including a spring, the biasing mechanism operative to bias the valve member away from the valve seat.

11. A nuclear reactor comprising:
a pressure vessel; and
an isolation valve including a mounting flange secured to a wall of the pressure vessel and a valve body disposed in the wall or in a flange assembly including the mounting flange, the isolation valve configured to close responsive to a pressure difference across the valve exceeding a threshold pressure difference, wherein:
the mounting flange includes a valve seat defined in the mounting flange; and
the valve body includes a valving element biased away from the valve seat defined in the mounting flange;
wherein a pressure difference across the valve exceeding the threshold pressure difference closes the isolation valve by causing the valving element to seat against the valve seat defined in the mounting flange.

12. The nuclear reactor of claim 11 wherein the isolation valve further includes a rod connected with the valving element and engaging a biasing element.

13. The nuclear reactor of claim 12 wherein the biasing element comprises:
a spring engaging the rod.

14. The nuclear reactor of claim 13 wherein the spring is disposed in the wall of the pressure vessel or in the flange assembly.

15. The nuclear reactor of claim 13 wherein the spring is disposed outside the wall of the pressure vessel and outside the flange assembly.

16. The nuclear reactor of claim 11 wherein the isolation valve further comprises:
a thermal sleeve, the valve body being disposed in the thermal sleeve.

17. The nuclear reactor of claim 11 further comprising an actuator operative to facilitate closure of the valve.

18. The nuclear reactor of claim 17 wherein the actuator comprises an actuator piston.

19. A nuclear reactor comprising:
a pressure vessel; and
an isolation valve including a mounting flange secured to a wall of the pressure vessel and a valve body disposed in the wall or in a flange assembly including the mounting flange, the isolation valve configured to close responsive to a pressure difference across the valve exceeding a threshold pressure difference, wherein the valve body comprises:
a tube having a first end opening to a valve seat defined in the mounting flange;
a valve member disposed in the tube having a sealing head sized to seat against the valve seat defined in the mounting flange.

20. The nuclear reactor of claim 19 further comprising a biasing mechanism including a spring, the biasing mechanism operative to bias the valve member away from the valve seat.

\* \* \* \* \*